United States Patent
Jung et al.

(10) Patent No.: US 12,203,017 B2
(45) Date of Patent: Jan. 21, 2025

(54) ELASTIC ONE-PART STRUCTURAL ADHESIVE TAPE

(71) Applicant: 3M INNOVATIVE PROPERTIES COMPANY, St. Paul, MN (US)

(72) Inventors: Adrian T. Jung, Kaarst (DE); Boris Tasch, Düsseldorf (DE)

(73) Assignee: 3M Innovative Properties Company, St. Paul, MN (US)

( * ) Notice: Subject to any disclaimer, the term of this patent is extended or adjusted under 35 U.S.C. 154(b) by 624 days.

(21) Appl. No.: 17/441,321

(22) PCT Filed: Mar. 30, 2020

(86) PCT No.: PCT/IB2020/053002
§ 371 (c)(1),
(2) Date: Sep. 21, 2021

(87) PCT Pub. No.: WO2020/201982
PCT Pub. Date: Oct. 8, 2020

(65) Prior Publication Data
US 2022/0177738 A1    Jun. 9, 2022

(30) Foreign Application Priority Data
Apr. 2, 2019  (EP) .................................... 19166897

(51) Int. Cl.
C09J 179/00 (2006.01)
C09J 7/10 (2018.01)
C09J 7/38 (2018.01)
C09J 11/06 (2006.01)

(52) U.S. Cl.
CPC . *C09J 7/38* (2018.01); *C09J 7/10* (2018.01); *C09J 11/06* (2013.01); *C09J 2301/124* (2020.08); *C09J 2463/00* (2013.01); *C09J 2479/00* (2013.01)

(58) Field of Classification Search
CPC ..... C09J 179/00; C09J 7/38; C09J 7/10; C09J 11/06
USPC ........................................................ 523/206
See application file for complete search history.

(56) References Cited

U.S. PATENT DOCUMENTS

| | | | |
|---|---|---|---|
| 3,379,562 A | 4/1968 | Freeman | |
| 3,453,242 A | 7/1969 | Schmitt | |
| 5,464,494 A | 11/1995 | Bolte | |
| 6,000,118 A | 12/1999 | Biernat | |
| 6,368,008 B1 | 4/2002 | Biernat | |
| 6,528,176 B1 | 3/2003 | Asai | |
| 2002/0182955 A1 | 12/2002 | Weglewski | |
| 2003/0153726 A1 | 8/2003 | Eckhardt | |
| 2004/0149164 A1 | 8/2004 | Eckhardt | |
| 2014/0370265 A1* | 12/2014 | Lee | C09J 5/06 522/111 |
| 2016/0288473 A1 | 10/2016 | Schwartz | |
| 2018/0371299 A1 | 12/2018 | Xu-Rabl | |

FOREIGN PATENT DOCUMENTS

| | | |
|---|---|---|
| DE | 1544837 | 6/1973 |
| EP | 0121430 | 8/1988 |
| EP | 0436745 | 6/1994 |
| EP | 0813576 | 12/1997 |
| EP | 1539897 | 6/2005 |
| EP | 1412177 | 5/2008 |
| EP | 2700683 | 2/2014 |
| EP | 3632964 | 4/2020 |
| EP | 3170657 | 9/2020 |
| EP | 2867322 | 6/2021 |
| JP | 11-501075 A | 1/1999 |
| JP | 2004-530756 A | 10/2004 |
| JP | 2014-504663 A | 2/2014 |
| WO | WO 1996-021704 | 7/1996 |
| WO | WO 1996/027640 A1 | 9/1996 |
| WO | WO 1997-031078 | 8/1997 |
| WO | WO 2007-014039 | 2/2007 |
| WO | WO 2009-071269 | 6/2009 |
| WO | WO 2009-144299 | 12/2009 |
| WO | WO 2011-063070 | 5/2011 |
| WO | WO 2011-109672 | 9/2011 |
| WO | WO 2012-024354 | 2/2012 |
| WO | WO 2012/092332 A2 | 7/2012 |
| WO | WO 2017-197087 | 11/2017 |
| WO | WO 2018/134721 A1 | 7/2018 |
| WO | WO 2019/003138 A1 | 1/2019 |
| WO | WO 2021-209861 | 10/2021 |

OTHER PUBLICATIONS

Dermer, Ethylenimine and other Aziridines: Chemistry and Applications, Academic Press, 1969, 5 pages.
Extended EP Search Report for EP Application No. 19166897.9, mailed on Oct. 28, 2019, 2 pages.
International Search Report for PCT International Application No. PCT/IB2020/053002, mailed on Jul. 2, 2020, 4 pages.

* cited by examiner

Primary Examiner — Deve V Hall
(74) Attorney, Agent, or Firm — Carlos M. Téllez Rodríguez; 3M Innovative Properties Company

(57) ABSTRACT

The present disclosure relates generally to the field of adhesives, more specifically to the field of structural adhesive tapes, in particular for use in bonding metal parts. The present disclosure also relates to a method of bonding two parts and to a composite article. The present disclosure is further directed to the use of a structural adhesive tape for industrial applications, such as construction and automotive applications, in particular for body-in-white bonding applications in the automotive industry.

15 Claims, No Drawings

ELASTIC ONE-PART STRUCTURAL ADHESIVE TAPE

CROSS REFERENCE TO RELATED APPLICATIONS

This application is a national stage filing under 35 U.S.C. 371 of PCT/IB2020/053002, filed Mar. 30, 2020, which claims the benefit of European Patent Application No. 19166897.9, filed Apr. 2, 2019, the disclosures of which are incorporated by reference in their entireties herein.

TECHNICAL FIELD

The present disclosure relates generally to the field of adhesives, more specifically to the field of structural adhesive tapes, in particular for use in bonding metal parts. The present disclosure also relates to a method of bonding two parts and to a composite article. The present disclosure is further directed to the use of a structural adhesive tape for industrial applications, such as construction and automotive applications, in particular for body-in-white bonding applications in the automotive industry.

BACKGROUND

Adhesives have been used for a variety of holding, sealing, protecting, marking and masking purposes. One type of adhesive which is particularly preferred for many applications is represented by structural adhesives. Structural adhesives are typically thermosetting resin compositions that may be used to replace or augment conventional joining techniques such as screws, bolts, nails, staples, rivets and metal fusion processes (e.g. welding, brazing and soldering). Structural adhesives are used in a variety of applications that include general-use industrial applications, as well as high-performance applications in the automotive and aerospace industries. To be suitable as structural adhesives, the adhesives shall exhibit high and durable mechanical strength as well as high impact resistance.

Structural adhesives may, in particular, be used for metal joints in vehicles. For example, an adhesive may be used to bond a metal panel, for example a roof panel to the support structure or chassis of the vehicle. Further, an adhesive may be used in joining two metal panels of a vehicle closure panel. Vehicle closure panels typically comprise an assembly of an outer and an inner metal panel whereby a hem structure is formed by folding an edge of an outer panel over an edge of the inner panel. Typically, an adhesive is provided there between to bond the panels together. Further, a sealant typically needs to be applied at the joint of the metal panels to provide for sufficient corrosion resistance. For example, U.S. Pat. No. 6,000,118 (Biernat et al.) discloses the use of a flowable sealant bead between the facing surfaces of the two panels, and a thin film of uncured paint-like resin between a flange on the outer panel and the exposed surface of the inner panel. The paint film is cured to a solid impervious condition by a baking operation performed on the completed door panel. U.S. Pat. No. 6,368,008 (Biernat et al.) discloses the use of an adhesive for securing two metal panels together. The edge of the joint is further sealed by a metal coating. WO 2009/071269 (Morral et al.) discloses an expandable epoxy paste adhesive as a sealant for a hem flange. A further hemmed structure is disclosed in U.S. Pat. No. 6,528,176 (Asai et al.). Further efforts have been undertaken to develop adhesive compositions whereby two metal panels, in particular an outer and an inner panel of a vehicle closure panel, could be joined with an adhesive without the need for a further material for sealing the joint. Thus, it became desirable to develop adhesive systems that provide adequate bonding while also sealing the joint and providing corrosion resistance. A partial solution has been described in e.g. WO 2007/014039 (Lamon), which discloses a thermally expandable and curable epoxy-based precursor of an expanded thermoset film toughened foamed film comprising a mixture of solid and liquid epoxy resins, and which is claimed to provide both favorable energy absorbing properties and gap filling properties upon curing. Other partial solutions have been described in EP-A1-2 700 683 (Elgimiabi et al.) and in WO 2017/197087 (Aizawa) which disclose structural adhesive films suitable for forming a hem flange structure. Structural adhesive films or tapes typically suffer from lack of elasticity and insufficient tackiness which makes them only partially suitable for hem flange bonding. Further partial solutions have been described in US-A1-2002/0182955 (Weglewski et al.) which discloses a so-called structural bonding tape. Structural adhesives in form of tapes may offer a number of advantages in industrial applications, e.g. easy application onto substrates even by fast automated equipment.

Structural bonding tapes or structural adhesive tapes usually comprise of an adhesive tape and at least one liner. The liner or two liners may be necessary to protect the tape from outer influences such as dust, dirt or humidity. They may also be necessary since common structural adhesive tapes exhibit at least some tack which may complicate their handling. Also, winding of these tapes into rolls usually also require liner(s) to separate the tacky tape surfaces from another. That is, in the state of the art, the use of liners makes rolls from structural adhesive tapes possible. Furthermore, the use of rolls from adhesive tapes is advantageous since a large amount of tape may be easily transported, handled and applied, in particular by automated equipment. On the other hand, the necessary use of liner material also generates waste which may arise in large amounts in industrial manufacturing sites. The collecting and disposal of used liner material may be connected with additional steps in industrial manufacturing lines, additional costs and certain environmental concerns. Another challenge connected with common structural adhesive tapes, e.g. based on epoxy chemistry, may be that these tapes need to be stored at lowered temperatures in order to prevent loss of adhesive properties or reactivity over time. Yet another challenge may arise from a phenomenon called "oozing" or "cold flow" which describes structural adhesive material slowly oozing out of the tape at the side of the roll.

Without contesting the technical advantages associated with the solutions known in the art, there is still a need for a structural adhesive material, in particular a tape, which would overcome the above-mentioned deficiencies.

SUMMARY

The present disclosure provides an adhesive tape, comprising a partially cured precursor of a (hybrid) structural adhesive composition, the composition comprising:
  a) a polymeric material comprising the self-polymerization reaction product of a polymerizable material comprising a cationically self-polymerizable monomer;
  b) optionally, some residual polymerization initiator of the cationically self-polymerizable monomer which is initiated at a temperature T1;
  c) a curable monomer which is different from the cationically self-polymerizable monomer; and d) a curing initiator of the curable monomer which is initiated at a temperature T2 and which is different from the polymerization initiator of the cationically self-polymerizable monomer, and wherein the curable monomers are substantially uncured and are in particular embedded into the polymeric material comprising the self-polymerization reaction product of a polymerizable material comprising a cationically self-polymerizable monomer.

The present disclosure further provides an adhesive tape roll, comprising the adhesive tape as described herein.

According to another aspect, the present disclosure provides a method of bonding two parts, the method comprising the following steps:

(i) providing a first part;
(ii) applying the adhesive tape as described herein to a surface of the first part;
(iii) applying the second part to the first part so that the adhesive tape is positioned between the first part and the second part; and
(iv) curing the adhesive tape so as to adhesively bond the two parts.

Finally, the present disclosure provides a use of the adhesive tape as described herein for manufacturing, maintenance or repair operations in industry, preferably construction, medicinal technology, aerospace, marine, transportation/rail or automotive industries.

DETAILED DESCRIPTION

According to a first aspect, the present disclosure relates to an adhesive tape, comprising a partially cured precursor of a (hybrid) structural adhesive composition, the composition comprising:

a) a polymeric material comprising the self-polymerization reaction product of a polymerizable material comprising a cationically self-polymerizable monomer;
b) optionally, some residual polymerization initiator of the cationically self-polymerizable monomer which is initiated at a temperature T1;
c) a curable monomer which is different from the cationically self-polymerizable monomer; and
d) a curing initiator of the curable monomer which is initiated at a temperature T2 and which is different from the polymerization initiator of the cationically self-polymerizable monomer, and wherein the curable monomers are substantially uncured and are in particular embedded into the polymeric material comprising the self-polymerization reaction product of a polymerizable material comprising a cationically self-polymerizable monomer.

In the context of the present disclosure, it has been surprisingly found that the adhesive tape according to the present disclosure, i.e. comprising a partially cured precursor of a (hybrid) structural adhesive composition, exhibits a combination of excellent characteristics and performance such as elasticity, tackiness, cold-flow, flexibility, handling properties and surface wetting, as well as providing good adhesive strength, ageing stability and corrosion resistance in their fully cured state. In particular, the adhesive tapes according to the present disclosure offer significant advantages over one component ("1K")- or two component ("2K") pasty adhesive formulations, like the precise amount of adhesive applicable, reduced waste, instant tack and ease of handling. That is, the adhesive tapes according to the present disclosure enable precise handling also by fast automated equipment, leading to an enhanced productivity in typical industrial manufacturing processes and improved and reproducible assembly results.

Hence, the adhesive tapes as described above have been surprisingly found to combine most of the advantageous characteristics of both the structural adhesive films and the structural bonding tapes known in the art, without exhibiting their known deficiencies.

It has further been discovered that, in some executions, the adhesive tape as described above is suitable for manufacturing structural adhesive compositions provided with excellent characteristics and performance as to adhesion to oily contaminated substrates, such as stainless steel and aluminum.

Without wishing to be bound by theory, it is believed that these excellent characteristics are due in particular to the combination of a polymeric material comprising the self-polymerization reaction product of a polymerizable material comprising a cationically self-polymerizable monomer; optionally, some residual polymerization initiator of the cationically self-polymerizable monomer which is initiated at a temperature T1; a curable monomer which is different from the cationically self-polymerizable monomer; and a curing initiator of the curable monomer which is initiated at a temperature T2 and which is different from the polymerization initiator of the cationically self-polymerizable monomer, and wherein the curable monomers are substantially uncured and are in particular embedded into the polymeric material comprising the self-polymerization reaction product of a polymerizable material comprising a cationically self-polymerizable monomer Still without wishing to be bound by theory, it is believed that this dual/hybrid curing system involving two independent reactive systems, which have a different chemical nature and which co-exist in the curable precursor without interfering with each other, has the ability to form —upon complete curing—an interpenetrating network involving a polymeric material comprising the self-polymerization reaction product of a polymerizable material comprising the cationically self-polymerizable monomer and a polymeric product resulting from the curing of the curable monomer.

More specifically, the above described hybrid curing system is particularly suitable to perform an overall curing mechanism involving a two-stage reaction whereby two polymer networks are formed sequentially.

In a first stage reaction (stage-B), the cationically self-polymerizable monomers polymerize upon initiation by the polymerization initiator of the cationically self-polymerizable monomer at a temperature T1, thereby forming a polymeric material, in the present context in the form of an adhesive tape, comprising the self-polymerization reaction product of a polymerizable material comprising the cationically self-polymerizable monomers. Typically, the temperature T1 at which the polymerization initiator of the cationically self-polymerizable monomer is initiated is insufficient to cause initiation of the curing initiator of the curable monomer. As a consequence, the first stage reaction typically results in a partially cured precursor, wherein the curable monomers are substantially uncured and are in particular embedded into the polymeric material comprising the self-polymerization reaction product of the polymerizable material comprising the cationically self-polymerizable monomers.

The first stage reaction which typically leads to a phase change of the initial curable precursor due in particular to the polymeric material comprising the self-polymerization reaction product of the cationically self-polymerizable monomers providing structural integrity to the initial curable precursor, is typically referred to as a film-forming reaction. Advantageously, the first stage reaction does typically not require any substantial energy input.

In the present context, the partially cured precursor typically takes the form of a self-supporting adhesive tape having a dimensional stability, which makes it possible for it to be pre-applied on a selected substrate, in particular a liner, until further processing. The adhesive tape is typically provided with excellent characteristics and performance as to elasticity, tackiness, cold-flow and surface wetting. Advantageously, the adhesive tape may be appropriately shaped to fulfil the requirements of any specific applications. The adhesive tape as used herein has the common meaning used in the art, i.e. it refers to a self-supporting, three-dimensional shaped, elongated article, wherein the thickness is much smaller than the length and width, and wherein the width is also smaller than the length. While common adhesive tapes in most cases comprise a backing onto which the adhesive is being casted, the adhesive tapes according to the present disclosure are self-supporting and therefore do not necessarily comprise a backing layer or any mesh or the like. This is due to the rigidness of the partially cured precursor of the (hybrid) structural adhesive composition as described herein.

Since the adhesive tapes as described herein exhibit a significant tack or adhesion to itself, but may be placed on and released from each other without losing their initial shape or damaging the surface or the material itself, it is preferred that the adhesive tape according to the present invention do not comprise a liner. Dispensing with a liner which are commonly a necessity in storing and handling of adhesive tapes, offers a number of advantages, such as greatly reduced cost of manufacturing the tape, improved handling of the tape, and also greatly reduced cost on the side of the professional user of the tape, in particular in large-scale manufacturing or assembly industrial applications. Hence, when using the adhesive tape as used herein, there is no need in collecting and removing used liner, which means direct simplification and cost savings implied in industrial assembly and manufacturing operations.

Preferably, the adhesive tape according to the present disclosure comprises at least one mesh. This has the effect of yielding an adhesive tape which exhibits increased strength and easier handling. In particular, a reinforcing in longitudinal direction of the tape may be achieved. This is advantageous for an automatic application of the adhesive tape, for instance by means of robotic application or by an automated or robotic application head. In this regard, it is preferred that the mesh is essentially embedded in the adhesive tape as disclosed herein. "Essentially embedded" refers to a state in which the mesh is situated within essentially within the tape, in contrast to e.g. a state in which a mesh is coated on one side with the adhesive composition, which could be described as a mesh backing layer coated with an adhesive. Essentially embedding the mesh in the adhesive tape has the advantage that while the tape displays an increased strength, it also offers adhesive properties to both sides of the embedded mesh.

It is further preferred that the mesh is selected from woven meshes and non-woven meshes, of which non-woven meshes are preferably employed. Woven meshes may be preferably selected from metallic meshes. Metallic meshes may be incorporated to provide a certain shielding effect against electric or electromagnetic influence, or an adhesive tape as described herein may be used for lightning strike protection purposes. The mesh is preferably selected to withstand the elevated temperatures required for fully curing the partially cured precursor of a (hybrid) structural adhesive composition comprised in the adhesive tape according to the present disclosure. The non-woven mesh is preferably selected from polymeric, carbon-fiber and inorganic meshes. Polymeric non-woven meshes provide improved strength to the adhesive tapes as disclosed herein, and are readily commercially available in a wide range of variations. Preferably, the at least one non-woven mesh comprises fibers selected from carbon fibers, polyester fibers, polyaramide fibers, polyamide fibers, nylon fibers, and any combinations and mixtures thereof. Essentially embedding a mesh into the adhesive tapes as described herein may also provide a conformability to the adhesive tape, and thereby it is much more suitable for automated handling and application, in particular by fast robotic equipment. For example, a polyester veil is available from Technical Fiber Products, Burneside, Uk. Carbon fiber meshes are known to provide great physical strength to a tape. Hence, an adhesive tape comprising at least one non-woven carbon fiber mesh may be used in highly demanding applications where not only particular strength, but also light-weight requirements are important, such as in aerospace or high-performance automotive applications, e.g. in racing cars or car racing equipment.

With regard to the dimensions of the adhesive tape as described herein, it is preferred that it has a thickness of at least 0.01 mm, preferably of at least 0.1 mm, more preferably of at least 0.2 mm. While even smaller thickness may be conceivable, they are not practicable for the envisaged industrial applications of the adhesive tapes as described herein. Furthermore, it is preferred that the adhesive tapes as described herein have a thickness of 1 cm and less, preferably of 3 mm and less, and more preferably of 2 mm and less. Also, larger thicknesses are conceivable, but are not relevant or impractical and may also suffer from deteriorated handling performance. Thus, it is preferred that the adhesive tape according to the present disclosure exhibit thicknesses in the range of from 0.01 mm to 1 cm, preferably from 0.1 mm to 3 mm, and more preferably from 0.2 mm to 2 mm.

In the following, typical and preferred features, processes and properties of the partially cured precursor of the (hybrid) structural adhesive composition comprised in the adhesive tape according to the present disclosure will be discussed: the second stage reaction (stage-A) occurs after the first stage reaction and typically involves curing the curable monomers upon initiation (typically thermal initiation) by the appropriate curing initiators at a temperature T2. This reaction step typically results in forming a polymeric product resulting from the curing of the curable monomer, in particular from the (co)polymerization of the curable monomers and the curing initiators (or curatives) of the curable monomers.

The curable precursor of the present disclosure typically relies on the above-described dual/hybrid curing system involving two independent reactive systems activated at distinct temperatures (T1 and T2) to ensure performing the above-described two-stage reaction in a sequential manner. Advantageously, the curable precursor of the present disclosure may be partially cured (or pre-cured) and pre-applied on a selected substrate before being finally cured in-place to produce a structural adhesive provided with excellent characteristics directly on the desired substrate or article.

As such, the curable precursor of the present disclosure is outstandingly suitable for bonding metal parts, in particular for hem flange bonding of metal parts in the automotive industry. Advantageously still, the curable precursor is suitable for automated handling and application, in particular by fast robotic equipment.

In the context of the present disclosure, the expression "cationically self-polymerizable monomer" is meant to refer to a monomer able to form a polymeric product (homopolymer) resulting from the polymerization of the monomer almost exclusively with itself and involving the formation of a cationic intermediate moiety, thereby forming a homopolymer. The term "homopolymer" is herein meant to designate polymer(s) resulting from the polymerization of a single type of monomers.

In the context of the present disclosure still, the expression "curable monomer" is mean to refer to a monomer able to form a polymeric product (heteropolymer) resulting from the (co)polymerization of the curable monomers and the curing initiators (or curatives) of the curable monomers. The term "heteropolymer" is herewith meant to designate a polymer resulting from the (co)polymerization of more than one type of monomers.

In the context of the present disclosure, the expression "the curable monomers are substantially uncured" is meant to designate that less than 10 wt %, less than 5 wt %, less than 2 wt %, or even less than 1 wt % of the initial curable monomers are unreacted.

The terms "glass transition temperature" and "Tg" are used interchangeably and refer to the glass transition temperature of a (co)polymeric material or a mixture of monomers and polymers. Unless otherwise indicated, glass transition temperature values are determined by Differential Scanning calorimetry (DSC).

According to one typical aspect of the curable precursor of the disclosure, the temperature T2 for use herein is greater than temperature T1. In a typical aspect, the temperature T1 at which the polymerization initiator of the cationically self-polymerizable monomer is initiated is insufficient to cause initiation of the curing initiator of the curable monomer which therefore remain substantially unreacted.

According to another typical aspect of the curable precursor of the disclosure, the cationically self-polymerizable monomer and the curable monomer for use herein are unable to chemically react with each other, in particular by covalent bonding, even when subjected to their respective polymerization or curing initiation. In an exemplary aspect, the cationically self-polymerizable monomer and the curable monomer are unable to chemically react with each other, when subjected to polymerization or curing initiation at a temperature of 23° C.

In one exemplary aspect of the present disclosure, the temperature T1 for use herein is no greater than 90° C., no greater than 80° C., no greater than 60° C., no greater than 50° C., no greater than 40° C., no greater than 30° C., no greater than 25° C., no greater than 20° C., or even no greater than 15° C. In some exemplary aspects of the disclosure, the polymerization initiator of the cationically self-polymerizable monomer is already initiated at room temperature (about 23° C.).

In another exemplary aspect of the present disclosure, the temperature T1 is in a range from −10° C. to 85° C., from 0° C. to 80° C., from 5° C. to 60° C., from 5° C. to 50° C., from 10 to 40° C., or even from 15 to 35° C.

In still another exemplary aspect of the present disclosure, the temperature T2 for use herein is greater than 90° C., greater than 100° C., greater than 120° C., greater than 140° C., greater than 150° C., greater than 160° C., greater than 180° C., or even greater than 200° C.

According to another typical aspect of the curable precursor, the temperature T2 is in a range from 95° C. to 250° C., from 100° C. to 220° C., from 120° C. to 200° C., from 140° C. to 200° C., from 140° C. to 180° C., or even from 160° C. to 180° C.

In some exemplary aspects of the disclosure, the curing initiator of the curable monomer for use herein which is initiated at a temperature T2 may be qualified as a thermally-initiated curing initiator or thermal initiator which is activated at substantially high temperatures.

Cationically self-polymerizable monomers for use herein are not particularly limited. Suitable cationically self-polymerizable monomers for use herein may be easily identified by those skilled in the art in the light of the present disclosure.

According to one advantageous aspect of the curable precursor of the disclosure, the cationically self-polymerizable monomer for use herein is able to polymerize by cationic ring-opening polymerization. Accordingly, and in a beneficial aspect, the cationically self-polymerizable monomer for use in the present disclosure comprises at least two heterocyclic groups, in particular cyclic amine groups.

According to another advantageous aspect of the disclosure, the cationically self-polymerizable monomer for use herein is further crosslinkable, in particular able to participate in crosslinking reactions of the polymer product resulting from the polymerization of the cationically self-polymerizable monomers.

In a beneficial aspect of the disclosure, the cationically self-polymerizable monomer for use herein is an oligomer having, in particular a number average molecular weight no greater than 20.000 g/mol, no greater than 15.000 g/mol, no greater than 12.000 g/mol, no greater than 10.000 g/mol, or even no greater than 8.000 g/mol. Unless otherwise indicated, the number average molecular weight as used in the present disclosure is determined by GPC using appropriate techniques well known to those skilled in the art, preferably determined by GPC according to ISO 13385-1 (2008).

According to a beneficial aspect of the disclosure, the cationically self-polymerizable monomer for use herein is a polyfunctional compound comprising at least one cyclic amine, preferably two cyclic amines. In an exemplary aspect, the cyclic amine which may be comprised in the cationically self-polymerizable monomer for use herein is selected from the group consisting of aziridines, azetidines, pyrrolidines, piperidines, and any combinations or mixtures thereof.

In one advantageous aspect, the cationically self-polymerizable monomer for use herein is a polyfunctional compound comprising at least two aziridine functional groups. More advantageously, the cationically self-polymerizable monomer for use herein is a polyfunctional aziridine, in particular a bis-aziridino compound.

In a more advantageous aspect of the disclosure, the cationically self-polymerizable monomer is an aziridino-functional oligomer. Advantageously, the cationically self-polymerizable monomer is an aziridino-functional polar oligomer.

In an exemplary aspect, the aziridino-functional oligomer for use herein has a number average molecular weight, preferably determined by GPC according to ISO 13385-1 (2008), of no greater than 20.000 g/mol, no greater than 15.000 g/mol, no greater than 12.000 g/mol, no greater than 10.000 g/mol, or even no greater than 8.000 g/mol.

According to another advantageous aspect of the disclosure, the cationically self-polymerizable monomer for use herein is an aziridino-functional compound based on an oligomeric backbone, in particular a linear oligomer backbone, more in particular a linear polar oligomer backbone.

In an exemplary aspect, the oligomeric backbone for use in the aziridino-functional compound comprises moieties selected from the group consisting of polyether, polyester, polyurethane, polythioether, polysulfide, silicone, polyalkylene, polystyrene, and any combinations of mixtures thereof. In a more advantageous aspect, the oligomeric backbone for use in the aziridino-functional compound comprises moieties selected from the group consisting of polyether, polyester, polythioether, and any combinations of mixtures thereof.

According to an advantageous aspect, the cationically self-polymerizable monomer is an aziridino-functional (linear) polyether oligomer, in particular an N-alkyl aziridino-functional (linear) polyether oligomer.

Suitable polyether oligomers may be produced in a manner known to those skilled in the art by the reaction of the starting compound having a reactive hydrogen atom with alkylene oxides, for example ethylene oxide, propylene oxide, butylene oxide, styrene oxide, tetrahydrofuran or epichlorohydrine or mixtures of two or more thereof. Especially suitable polyether oligomers for use herein are obtainable by polyaddition of ethylene oxide, 1,2-propylene oxide, 1,2-butylene oxide or tetrahydrofuran or of mixtures of two or more of the mentioned compounds with the aid of a suitable starting compound and a suitable catalyst.

In a particularly beneficial aspect, suitable polyether oligomers for use herein are polyetherdiols obtainable by cationic copolymerization of ethylene oxide and tetrahydrofuran under catalytic action of boron trifluoride etherate. Suitable cationically self-polymerizable monomers for use herein and possible production methods thereof are described e.g. in U.S. Pat. No. 3,453,242 (Schmitt et al.).

According to one preferred execution of the present disclosure, the cationically self-polymerizable monomer for use herein has the following formula:

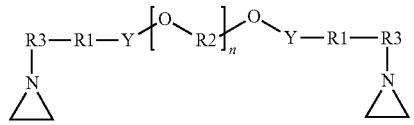

wherein:
R¹ is a covalent bond or an alkylene group;
each R² is independently selected from the group consisting of alkylene groups;
R³ is a straight chain or branched alkylene groups;
Y is a divalent linking group;
and n is an integer selected such that the calculated number average molecular weight of the polyether oligomer is in particular greater than 2000 g/mol.

According to another preferred execution of the present disclosure, the cationically self-polymerizable monomer for use herein has the following formula:

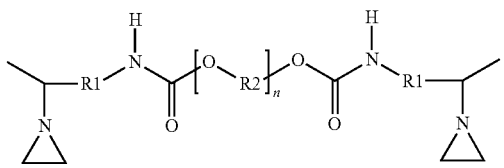

wherein:
R¹ is an alkylene group;
each R² is independently selected from the group consisting of alkylene groups having 2 to 6 carbon atoms; and
n is an integer selected such that the calculated number average molecular weight of the polyether oligomer is in particular between 2000 and 10.000 g/mol.

According to still another preferred execution of the present disclosure, the cationically self-polymerizable monomer for use herein has the following formula:

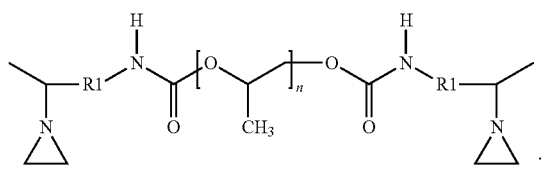

In an advantageous aspect, radical R¹ is an alkylene group having two carbon atoms. In another advantageous aspect, radical R² is independently selected from the group consisting of linear alkylene groups having 2 to 6 carbon atoms.

According to still another advantageous aspect of the present disclosure, the cationically self-polymerizable monomer for use herein has the following formula:

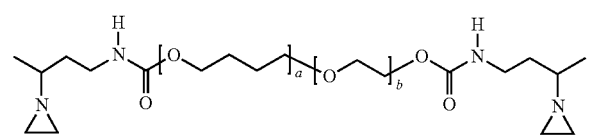

wherein a and b are integers greater than or equal to 1, and the sum of a and b is equal to n.

According to an exemplary aspect of the disclosure, n is selected such that the calculated number average molecular weight of the cationically self-polymerizable monomer is no greater than 10.000 grams/mole.

Curable monomers for use herein are not particularly limited, as long as they are different from the cationically self-polymerizable monomers. Any curable monomers commonly known in the art of structural adhesives may be used in the context of the present disclosure. Suitable curable monomers for use herein may be easily identified by those skilled in the art in the light of the present disclosure.

According to one particular aspect of the disclosure, the curable monomer for use herein is a cationically curable monomer, which is in particular curable by cationic ring-opening curing.

According to an advantageous aspect of the present disclosure, the curable monomer for use herein comprises at least one functional group selected from the group consisting of epoxy groups, in particular glycidyl groups.

According to another advantageous aspect, the curable monomer for use herein is an epoxy resin. Exemplary epoxy resins for use herein may be advantageously selected from the group consisting of phenolic epoxy resins, bisphenol epoxy resins, hydrogenated epoxy resins, aliphatic epoxy resins, halogenated bisphenol epoxy resins, novolac epoxy resins, and any mixtures thereof.

Epoxy resins are well known to those skilled in the art of structural adhesive compositions. Suitable epoxy resins for use herein and their methods of manufacturing are amply described e.g. in EP-A1-2 700 683 (Elgimiabi et al.) and in WO 2017/197087 (Aizawa).

In a particularly advantageous aspect of the disclosure, the curable monomer for use herein is an epoxy resin selected from the group consisting of novolac epoxy resins, bisphenol epoxy resins, in particular those derived from the reaction of bisphenol-A with epichlorhydrin (DGEBA resins), and any mixtures thereof.

Polymerization initiators of the cationically self-polymerizable monomer for use herein are not particularly limited. Any polymerization initiators of cationically self-polymerizable monomers commonly known in the art of structural adhesives may be used in the context of the present disclosure. Suitable polymerization initiators of the cationically self-polymerizable monomer for use herein may be easily identified by those skilled in the art in the light of the present disclosure.

Exemplary polymerization initiators of the cationically self-polymerizable monomer for use herein are amply described in O. C. DERMER, G. E. HAM "Ethylenimine and other Aziridines", Academic Press (1969), and in particular in US-A1-2003/0153726 (Eckhardt et al.).

According to one exemplary aspect of the disclosure, the polymerization initiator of the cationically self-polymerizable monomer for use herein is selected from the group consisting of protonating agents, alkylating agents, and any combinations or mixtures thereof.

In one advantageous aspect of the disclosure, the polymerization initiator of the cationically self-polymerizable monomer is selected from the group consisting of alkylating agents, in particular from the group consisting of arylsulphonic acid esters, sulfonium salts, in particular alkyl sulfonium salts, and any combinations or mixtures thereof.

More advantageously, the polymerization initiator of the cationically self-polymerizable monomer for use herein is selected from the group of arylsulphonic acid esters, in particular from the group consisting of p-toluene sulphonic acid esters, and preferably methyl-p-toluene sulfonate.

In an alternatively advantageous aspect of the disclosure, the polymerization initiator of the cationically self-polymerizable monomer is selected from the group consisting of protonating agents, in particular from the group consisting of Lewis acids, Broensted acids or precursor of Broensted acids, and any combinations or mixtures thereof.

In another advantageous aspect, the polymerization initiator of the cationically self-polymerizable monomer for use in the present disclosure is selected from the group consisting of Broensted acids, in particular from the group consisting of sulfonic acids, sulfonium acids, phosphonic acids, phosphoric acids, carboxylic acids, antimonic acids, boric acids, and any combinations, mixtures or salts thereof.

In still another advantageous aspect, the polymerization initiator of the cationically self-polymerizable monomer for use in the present disclosure is selected from the group consisting of Broensted acids, in combination with antacid-acting components, in particular selected from the group consisting of oxides, hydroxides, carbonates and carboxylates of the elements aluminium, chromium, copper, germanium, manganese, lead, antimony, tin, tellurium, titanium and zinc. The antacid-acting component may beneficially be selected to comprise zinc, and wherein the polymerization initiator of the cationically self-polymerizable monomer is in particular selected to be zinc tosylate.

Curing initiators of the curable monomer for use herein are not particularly limited, as long as they are different from the polymerization initiators of the cationically self-polymerizable monomers. Any curing initiators of curable monomers commonly known in the art of structural adhesives may be used in the context of the present disclosure. Suitable curing initiators for use herein may be easily identified by those skilled in the art in the light of the present disclosure.

According to one typical aspect of the disclosure, the curing initiator for use herein is selected from the group consisting of rapid-reacting curing initiators, latent curing initiators, and any combinations or mixtures thereof. More typically, the curing initiator for use herein is selected from the group consisting of rapid-reacting thermally-initiated curing initiators, latent thermally-initiated curing initiators, and any combinations or mixtures thereof.

According to an advantageous aspect of the present disclosure, the curing initiator of the curable monomer is selected from the group consisting of primary amines, secondary amines, and any combinations or mixtures thereof.

According to another advantageous aspect, the amines for use as curing initiator of the curable monomer are selected from the group consisting of aliphatic amines, cycloaliphatic amines, aromatic amines, aromatic structures having one or more amino moiety, polyamines, polyamine adducts, dicyandiamides, and any combinations or mixtures thereof.

According to still another advantageous aspect of the disclosure, the curing initiator of the curable monomer for use herein is selected from the group consisting of dicyandiamide, polyamines, polyamine adducts, and any combinations or mixtures thereof.

In a preferred aspect, the curing initiator of the curable monomer is selected to be dicyandiamide.

In an advantageous execution, the curable precursor of the present disclosure further comprises a curing accelerator of the curable monomer, which is in particular selected from the group consisting of polyamines, polyamine adducts, ureas, substituted urea adducts, imidazoles, imidazole salts, imidazolines, aromatic tertiary amines, and any combinations or mixtures thereof.

Curing initiators and curing accelerators are well known to those skilled in the art of structural adhesive compositions. Suitable curing initiators and curing accelerators for use herein and their methods of manufacturing are amply described e.g. in EP-A1-2 700 683 (Elgimiabi et al.) and in WO 2017/197087 (Aizawa).

In one preferred execution, the curing accelerator of the curable monomer is selected from the group of polyamine adducts, substituted ureas, in particular N-substituted urea adducts.

In a particularly preferred execution of the disclosure, the curing accelerator of the curable monomer is selected from the group of substituted urea adducts, in particular N-substituted urea adducts. In the context of the present disclosure, it has been indeed surprisingly discovered that the use of a curing accelerator of the curable monomer selected from the group of substituted urea adducts, in particular N-substituted urea adducts, substantially improve the adhesion properties, in particular the peel adhesion properties of the resulting structural adhesive composition.

According to a typical aspect of the present disclosure, the curable precursor further comprises a second curable monomer which is also different from the cationically self-polymerizable monomer.

In an advantageous aspect, the second curable monomer for use in the present disclosure comprises at least one functional group selected from the group consisting of epoxy groups, in particular glycidyl groups. Advantageously still, the second curable monomer for use herein is an epoxy resin, in particular selected from the group consisting of phenolic epoxy resins, bisphenol epoxy resins, hydrogenated epoxy resins, aliphatic epoxy resins, halogenated bisphenol epoxy resins, novolac epoxy resins, and any mixtures thereof.

In a particularly preferred execution of the disclosure, the second curable monomer for use herein is an epoxy resin selected from the group consisting of hydrogenated bisphenol epoxy resins, in particular those derived from the reaction of hydrogenated bisphenol-A with epichlorhydrin (hydrogenated DGEBA resins), and any mixtures thereof. In the context of the present disclosure, it has been indeed surprisingly discovered that the use of a second curable monomer selected in particular from the group of hydrogenated bisphenol epoxy resins, substantially maintains or even improve the adhesion properties, in particular the peel adhesion properties of the resulting structural adhesive composition towards oily contaminated substrates. These specific curable precursors are particularly suitable to result into structural adhesive compositions having outstanding excellent oil-contamination tolerance towards, in particular oily contaminated metal substrates.

Exemplary oily contamination is for example mineral oils, and synthetic oils. Typical mineral oils include paraffinic mineral oils, intermediate mineral oils and naphthenic mineral oils.

In an advantageous aspect, the adhering step(s) of the surfaces to be bonded may be performed without using a pre-cleaning step of the substrates, parts and, and/or without using an adhesion promoter, in particular a priming composition or a tie layer.

According to another advantageous aspect, the curable precursor according to the disclosure further comprises a thermoplastic resin. Thermoplastic resins for use herein are not particularly limited. Any thermoplastic resins commonly known in the art of structural adhesives may be used in the context of the present disclosure. Suitable thermoplastic resins for use herein may be easily identified by those skilled in the art in the light of the present disclosure.

Thermoplastic resins are known to those skilled in the art of structural adhesive compositions. Suitable exemplary thermoplastic resins for use herein are described e.g. in EP-A1-2 700 683 (Elgimiabi et al.).

According to one advantageous aspect of the disclosure, the thermoplastic resins for use herein have a glass transition temperature (Tg) in a range from 60° C. and 140° C., when measured by Differential Scanning calorimetry (DSC).

In a more advantageous aspect, the thermoplastic resins for use herein have a softening point comprised between 70° C. and 120° C., preferably between 80° C. and 100° C., more preferably between 85° C. and 95° C.

According to another advantageous aspect of the disclosure, the thermoplastic resin for use herein is selected from the group consisting of polyether thermoplastic resins, polypropylene thermoplastic resins, polyvinyl chloride thermoplastic resins, polyester thermoplastic resins, polycaprolactone thermoplastic resins, polystyrene thermoplastic resins, polycarbonate thermoplastic resins, polyamide thermoplastic resins, polyurethane thermoplastic resins, and any combinations of mixtures thereof.

According to still another advantageous aspect of the disclosure, the thermoplastic resin for use herein is selected from the group of polyether thermoplastic resins, and in particular polyhydroxyether thermoplastic resins.

In a more advantageous aspect, the polyhydroxyether thermoplastic resins for use herein are selected from the group consisting of phenoxy resins, polyether diamine resins, polyvinylacetal resins, in particular polyvinyl butyral resins, and any combinations or mixtures thereof.

According to a particularly preferred execution of the disclosure, the thermoplastic resin for use herein is selected from the group of phenoxy resins.

In the context of the present disclosure, it has been indeed surprisingly discovered that the use of a thermoplastic resin, in particular a thermoplastic resin selected from the group of phenoxy resins, substantially improve the adhesion properties, in particular the peel adhesion properties, as well as the toughening characteristics of the resulting structural adhesive composition. This is particularly surprising and counterintuitive as thermoplastic resins are generally recognized and used as film-forming additives.

According to an advantageous aspect of the disclosure, the curable precursor is substantially free of acrylic-based monomers or acrylic resins. By "substantially free of acrylic-based monomers or acrylic resins", it is herewith meant to express that the curable precursor comprises less than 10 wt %, less than 5 wt %, less than 2 wt %, less than 1 wt %, or even less than 0.5 wt % of acrylic-based monomers or acrylic resins.

According to another advantageous aspect, the curable precursor of the disclosure is substantially free of free radical-polymerizable monomers or compounds, in particular irradiation-initiated free radical initiators. By "substantially free of free radical-polymerizable monomers or compounds", it is herewith meant to express that the curable precursor comprises less than 10 wt %, less than 5 wt %, less than 2 wt %, less than 1 wt %, or even less than 0.5 wt % of free radical-polymerizable monomers or compounds.

Furthermore, it is preferred that the partially cured precursor of the (hybrid) structural adhesive composition comprised in the adhesive tape according to the present disclosure further comprises at least one silica compound, preferably at least one fused silica compound. This may have the effect of an increased strength and/or rigidity of the adhesive tapes as disclosed herein. In this regard, it is preferred that the fused silica is contained in the partially cured precursor of the (hybrid) structural adhesive composition comprised in the adhesive tape according to the present disclosure in an amount in the range of from 0 to 30 wt.-%, preferably from 1 to 25 wt.-%, more preferably from 5 to 20 wt.-%, based on the total weight of the adhesive tape according to the present disclosure or the precursor of the (hybrid) structural adhesive composition comprised in the adhesive tape as described herein.

Preferably, the curable precursor as described herein comprises:
  a) from 0.1 to 20 wt %, from 0.5 to 15 wt %, from 0.5 to 10 wt %, or even from 1 to 5 wt % of a cationically self-polymerizable monomer;
  b) from 10 to 80 wt %, from 20 to 70 wt %, or even from 20 to 60 wt %, of a curable monomer;
  c) from 0.01 to 10 wt %, from 0.02 to 8 wt %, from 0.05 to 5 wt %, from 0.1 to 3 wt %, or even from 0.2 to 2 wt %, of a polymerization initiator of the cationically self-polymerizable monomer;
  d) from 0.1 to 20 wt %, from 0.2 to 15 wt %, from 0.2 to 10 wt %, from 0.5 to 8 wt %, or even from 1 to 6 wt %, of a curing initiator of the curable monomer;
  e) from 0 to 60 wt %, from 1 to 50 wt %, from 1 to 40 wt %, from 2 to 30 wt %, from 5 to 30 wt %, from 5 to 20 wt %, or even from 8 to 15 wt %, of a second curable monomer;
  f) from 0 to 20 wt %, from 0.2 to 15 wt %, from 0.2 to 10 wt %, from 0.5 to 8 wt %, or even from 1 to 5 wt %, of a thermoplastic resin; and g) from 0 to 20 wt %, from 0.05 to 15 wt %, from 0.1 to 10 wt %, from 0.5 to 8 wt %, or even from 0.5 to 5 wt %, of a curing accelerator of the curable monomer;

h) from 0 to 30 wt.-%, preferably from 1 to 25 wt.-%, more preferably from 5 to 20 wt.-% of fused silica, and i) optionally, a toughening agent.

According to an advantageous aspect of the disclosure, the curable precursor comprises a cationically self-polymerizable monomer and a curable monomer in a weight ratio ranging from 0.5:99.5 to 50:50, from 1:99 to 40:60, from 1:99 to 30:70, from 2:98 to 30:70, from 2:98 to 20:80, from 2:98 to 15:85, from 2:98 to 10:90, from 3:97 to 8:92, or even from 3:97 to 6:94. In a typical aspect of the partially cured precursor of a structural adhesive, the curable monomers are substantially uncured and are, in particular, embedded into the polymeric material comprising the self-polymerization reaction product of a polymerizable material comprising a cationically self-polymerizable monomer. In a typical aspect, the curable monomers are still liquid monomers embedded into the polymeric material resulting from the self-polymerization of the cationically self-polymerizable monomers, wherein this polymeric material represents a fully-established three-dimensional network.

The partially cured precursor typically is a stable and self-supporting composition having a dimensional stability, which makes it possible for it to be pre-applied on a selected substrate, in particular a liner, until further processing. In particular, the pre-applied substrate may be suitably transferred to other production sites until final full curing is performed. Advantageously still, the partially cured precursor may be appropriately shaped to fulfil the specific requirements of any selected applications. The partially cured precursor is typically provided with excellent characteristics and performance as to elasticity, tackiness, cold-flow and surface wetting.

According to a typical aspect of the partially cured precursor according to the disclosure, the polymeric material comprising the self-polymerization reaction product of the polymerizable material comprising the cationically self-polymerizable monomer is substantially fully polymerized and has in particular a degree of polymerization of more than 90%, more than 95%, more than 98%, or even more than 99%. As the polymeric material comprising the self-polymerization reaction product of the cationically self-polymerizable monomer is substantially fully polymerized, this polymerization reaction has advantageously a fixed and irreversible end and will not trigger any shelf-life reducing reactions in the remaining of the curable precursor. This characteristic will beneficially impact the overall shelf-life of the curable precursor.

According to a particularly advantageous aspect of the partially cured precursor, the polymeric material comprises or consists of a polyetherimine, in particular a linear or branched polyethylenimine (PEI). The polyetherimine typically results from the self-polymerization of bis-aziridino compounds, in particular N-alkyl aziridino-functional polyether oligomers, acting as cationically self-polymerizable monomers.

In one typical aspect of the disclosure, the partially cured precursor has a shear storage modulus in a range from 1000 to 250.000 Pa, from 1000 to 200.000 Pa, from 2000 to 150.000 Pa, from 3000 to 150.000 Pa, from 3000 to 100.000 Pa, or even from 3000 to 80.000 Pa, when measured according to the test method described in the experimental section.

In one advantageous aspect, the partially cured precursor according to the disclosure has a glass transition temperature (Tg) no greater than 0° C., no greater than −5° C., no greater than −10° C., no greater than −15° C., or even no greater than −20° C., when measured by DSC.

In another advantageous aspect of the disclosure, the adhesive tape as described herein has an elongation at break of at least 50%, at least 80%, at least 100%, at least 150%, or even at least 200%, when measured according to tensile test DIN EN ISO 527. This particular property makes the adhesive tape excellently suitable for automated handling and application, in particular by high-speed robotic equipment. More particularly, the adhesive tape of the present disclosure enables efficient automation of the process of forming a metal joint between metal plates.

In a typical aspect, the structural adhesive composition comprises an interpenetrating network involving the polymeric material comprising the self-polymerization reaction product of the polymerizable material comprising the cationically self-polymerizable monomer and the polymeric product resulting from the curing of the curable monomer.

According to still another aspect of the present disclosure, it is provided a curing system suitable for a structural adhesive composition, wherein the curing system comprises:
a) a polymerization initiator of a cationically self-polymerizable monomer which is initiated at a temperature T1; and
b) a curing initiator of a curable monomer which is initiated at a temperature T2 and which is different from the polymerization initiator of the cationically self-polymerizable monomer.

In a typical aspect of the curing system, the temperature T2 is greater than T1, and the temperature T1 at which the polymerization initiator of the cationically self-polymerizable monomer is initiated is insufficient to cause initiation of the curing initiator of the curable monomer.

All the particular and preferred aspects relating to, in particular, the structural adhesive composition, the cationically self-polymerizable monomer, the polymerization initiator of the cationically self-polymerizable monomer, the curable monomer, the curing initiator of the curable monomer, the temperatures T1 and T2, and the partially cured precursor which were described hereinabove in the context of the curable precursor or the partially cured precursor, are fully applicable to the curing system for a structural adhesive composition.

In yet another aspect, the present disclosure relates to a composite article comprising an adhesive tape as described above applied on at least part of the surface of the article.

Suitable surfaces and articles for use herein are not particularly limited. Any surfaces, articles, substrates and material commonly known to be suitable for use in combination with structural adhesive compositions may be used in the context of the present disclosure.

Since the adhesive tape according to the present disclosure exhibits a certain tack to itself, but can release again without any damage, the adhesive tape is excellently suited for being wound up into a roll without the use of liner material between the various layers of tape. Accordingly, the present disclosure further provides an adhesive tape roll, comprising the adhesive tape as described herein. The adhesive tape roll is particularly advantageous in industrial applications since the tape may be easily unwound from the roll, does not exhibit cold flow, oozing or squeeze-out of material, and further exhibits excellent shelf-life. Additionally, the rigidness of the adhesive tape as described herein and the above ease of damage-free unwinding of the adhesive tape from the roll as described herein allow for the use of the adhesive roll and adhesive tape in industrial applications, in particular employing fast automated or robotic equipment. Also, the lack of liner material represents a significant advantage for industrial assembly or manufacturing processes, since no collection of post-use liner material and its disposal is necessary, giving rise to also significant potential for cost savings and meeting environmental considerations for modern industrial processes. The term "adhesive tape roll" has the common meaning used in the art, i.e. adhesive tape wound onto a roll. In most cases, a roll of this type comprises at least one layer of adhesive tape wound around a core, wherein the core comprises a polymeric, composite or even metallic material. Thus, preferably, the adhesive roll as described herein comprises at least one layer, preferably several layers, of the adhesive tape as described herein wound around a core. It is particular preferred that no liner materials are contained between the layers of adhesive tape in the roll according to the present invention for the reasons and the various advantages arising therefrom as described above. Preferably, the adhesive tape roll according to the present disclosure is in the form of a level-wound roll, a planetary roll, or a trimmed spool, of which a level-wound roll is particularly preferred for applications in automotive manufacturing and assembly processes.

In yet another aspect of the present disclosure, it is a provided a method of bonding two parts comprising the step of using the adhesive tape according to the present invention.

According to a particular aspect of the disclosure, the method of bonding two parts comprises the steps of:
a) applying the adhesive tape as described herein to a surface of at least one of the two parts;
b) joining the two parts so that the adhesive tape is positioned between the two parts; and
c) curing the adhesive tape so as to adhesively bond the two parts.

Preferably, the two parts are selected from metal, polymer, composite, wood, glass and ceramic materials. The material of the first part and the second part may be the same or different. In a preferred embodiment, the material of the first part and the second part are different. In another preferred embodiment, they are the same. Preferably, the material of the first and second part is metal, wherein the metal is selected from steel, aluminium, magnesium, titanium, copper and their alloys.

According to another advantageous aspect, the method of bonding two parts is for hem flange bonding of metal parts, wherein:
the adhesive tape has a first portion near a first end of said adhesive tape and a second portion near the second end opposite to the first end of said adhesive tape;
the first metal part comprises a first metal panel having a first body portion and a first flange portion along a margin of said first body portion adjacent a first end of said first body portion;
the second metal part comprises a second metal panel having a second body portion and a second flange portion along a margin of said second body portion adjacent a second end of said second body portion;
wherein the method comprises the steps of:
a) adhering the adhesive tape to said first metal panel or second metal panel, whereby following adhering and folding, a metal joint is obtained wherein the partially cured precursor film is folded such that:
i. the first portion of the adhesive tape is provided between the second flange of the second metal panel and the first body portion of the first metal panel, and
ii. the second portion of the adhesive tape is provided between the first flange of the first metal panel and the second body portion of the second metal panel; and
b) substantially fully curing the adhesive tape by initiating the curing initiator of the cationically curable monomer, thereby obtaining a substantially fully cured (hybrid) structural adhesive composition and bonding the metal joint.

According to still another advantageous aspect of the method of bonding two parts, a side of a first edge portion of the first metal part is folded back and a hem flange structure is formed so as to sandwich the second metal part, and the adhesive tape as described above is disposed so as to adhere at least the first edge portion of the first metal part and a first surface side of the second metal part to each other.

Methods of bonding two parts, in particular for hem flange bonding of metal parts, are well known to those skilled in the art of structural adhesive compositions. Suitable methods of bonding two parts for use herein are amply described e.g. in EP-A1-2 700 683 (Elgimiabi et al.) and in WO 2017/197087 (Aizawa).

In a particular aspect of the present disclosure, the substrates, parts and surfaces for use in these methods comprise a metal selected from the group consisting of aluminum, steel, iron, and any mixtures, combinations or alloys thereof. More advantageously, the substrates, parts and surfaces for use herein comprise a metal selected from the group consisting of aluminum, steel, stainless steel and any mixtures, combinations or alloys thereof. In a particularly advantageous execution of the present disclosure, the substrates, parts and surfaces for use herein comprise aluminum.

According to another aspect, the present disclosure relates to a metal part assembly obtainable by the method(s) as described above. In another aspect, an assembly is provided, comprising at least two parts which are connected by the adhesive tape as disclosed herein. The adhesive tape may be fully cured, thereby adhesively connecting the at least two parts together. According to another aspect of the assembly, the adhesive tape is not in the cured state. However, in this state, the adhesive tape according to the present disclosure may act as a sealant, i.e. sealing the assembly at least to a certain extent against humidity and/or dust. Moreover, it may be advantageous to have the possibility to at least partially dissemble the assembly. Furthermore, it may be advantageous if an assembly is only sealed and secured in an event of elevated temperatures, such as in an event of being exposed to a fire. Preferably, the material of parts of the assembly according to the present disclosure is the same as described for the method of bonding two parts as described herein. In this regard, it is preferred that one or all of the parts are panels. In another particular preferred aspect of the present disclosure, the assembly as described herein is a hem flange.

According to still another aspect, the present disclosure relates to the use of the adhesive tape or of the adhesive tape roll as described herein for manufacturing, maintenance or repair operations in industry, preferably in construction, medical technologies, aerospace, marine, transportation, rail or automotive industries. Preferably, the use comprises adhesively connecting parts and/or metals.

According to yet another aspect, the present disclosure relates to the use of the adhesive tape or of the adhesive tape roll as described herein, for bonding metal parts, in particular for hem flange bonding of metal parts in the automotive industry. In particular, the use as described herein comprises body-in-white manufacturing operations in the automotive industries.

The following items will further illustrate the present disclosure as exemplary and preferred embodiments:

1. An adhesive tape, comprising a partially cured precursor of a (hybrid) structural adhesive composition, the composition comprising:
   a) a polymeric material comprising the self-polymerization reaction product of a polymerizable material comprising a cationically self-polymerizable monomer;
   b) optionally, some residual polymerization initiator of the cationically self-polymerizable monomer which is initiated at a temperature T1;
   c) a curable monomer which is different from the cationically self-polymerizable monomer; and
   d) a curing initiator of the curable monomer which is initiated at a temperature T2 and which is different from the polymerization initiator of the cationically self-polymerizable monomer, and wherein the curable monomers are substantially uncured and are in particular embedded into the polymeric material comprising the self-polymerization reaction product of a polymerizable material comprising a cationically self-polymerizable monomer.
2. The adhesive tape according to item 1, wherein the adhesive tape does not comprise a liner.
3. The adhesive tape according to item 1 or item 2, wherein the adhesive tape further comprises at least one mesh.
4. The adhesive tape according to item 3, wherein the at least one mesh is essentially embedded in the adhesive tape.
5. The adhesive tape according to item 3 or item 4, wherein the at least one mesh is selected from woven meshs and non-woven meshs.
6. The adhesive tape according to item 5, wherein the at least one mesh is selected from non-woven meshs, preferably from polymeric meshs, carbon-fiber mesh and inorganic meshs.
7. The adhesive tape according to item 6, wherein the at least one non-woven mesh comprises fibers selected from carbon fibers, polyester fibers, polyamide fibers, polyaramide fibers, nylon fibers, and any mixtures and combinations thereof.
8. The adhesive tape according to any one of the preceding items, wherein the adhesive tape has a thickness of at least 0.01 mm, preferably of at least 0.1 mm, more preferably of at least 0.2 mm.
9. The adhesive tape according to any one of the preceding items, wherein the adhesive tape has a thickness of 1 cm and less, preferably of 3 mm and less, more preferably of 2 mm and less.
10. The adhesive tape according to any one of the preceding items, wherein the adhesive tape has a thickness in the range of from 0.05 to 5 mm, preferably from 0.1 to 3 mm, and more preferably from 0.2 to 2 mm.
11. The adhesive tape according to any one of the preceding items, wherein the polymeric material comprising the self-polymerization reaction product of the polymerizable material comprising the cationically self-polymerizable monomer is substantially fully polymerized and has in particular a degree of polymerization of more than 90%, more than 95%, more than 98%, or even more than 99%.
12. The adhesive tape according to any one of the preceding items, wherein the polymeric material comprises or consists of a polyetherimine, in particular a linear or branched polyethylenimine (PEI).
13. The adhesive tape according to any one of the preceding items, wherein the temperature T2 is greater than T1, and wherein the temperature T1 at which the polymerization initiator of the cationically self-polymerizable monomer is initiated is insufficient to cause initiation of the curing initiator of the curable monomer.
14. The adhesive tape according to any one of the preceding items, wherein the cationically self-polymerizable monomer and the curable monomer are unable to chemically react with each other, in particular by covalent bonding, even when subjected to polymerization or curing initiation.
15. The adhesive tape according to any one of the preceding items, wherein the cationically self-polymerizable monomer and the curable monomer are unable to chemically react with each other, when subjected to polymerization or curing initiation at a temperature of 23° C.
16. The adhesive tape according to any one of the preceding items, wherein the temperature T1 is no greater than 90° C., no greater than 80° C., no greater than 60° C., no greater than 50° C., no greater than 40° C., no greater than 30° C., no greater than 25° C., no greater than 20° C., or even no greater than 15° C.
17. The adhesive tape according to any one of the preceding items, wherein the temperature T1 is in a range from −10° C. to 85° C., from 0° C. to 80° C., from 5° C. to 60° C., from 5° C. to 50° C., from 10 to 40° C., or even from 15 to 35° C.
18. The adhesive tape according to any one of the preceding items, wherein the temperature T2 is greater than 90° C., greater than 100° C., greater than 120° C., greater than 140° C., greater than 150° C., greater than 160° C., greater than 180° C., or even greater than 200° C.
19. The adhesive items according to any one of the preceding items, wherein the temperature T2 is in a range from 95° C. to 250° C., from 100° C. to 220° C., from 120° C. to 200° C., from 140° C. to 200° C., from 140° C. to 180° C., or even from 160° C. to 180° C.
20. The adhesive tape according to any one of the preceding items, wherein the cationically self-polymerizable monomer is further crosslinkable.
21. The adhesive tape according to any one of the preceding items, wherein the cationically self-polymerizable monomer polymerizes by cationic ring-opening polymerization.
22. The adhesive tape according to any one of the preceding items, wherein the cationically self-polymerizable monomer is an oligomer having, in particular a number average molecular weight, preferably determined by GPC according to ISO 13385-1 (2008), of no greater than 20.000 g/mol, no greater than 15.000 g/mol, no greater than 12.000 g/mol, no greater than 10.000 g/mol, or even no greater than 8.000 g/mol.
23. The adhesive tape according to any one of the preceding items, wherein the cationically self-polymerizable monomer is a polyfunctional compound comprising at least one cyclic amine, preferably two cyclic amines.
24. The adhesive tape according to any one of the preceding items, wherein the cyclic amine is selected from the group consisting of aziridines, azetidines, pyrrolidines, piperidines, and any combinations or mixtures thereof.

25. The adhesive tape according to any one of the preceding items, wherein the cationically self-polymerizable monomer is a polyfunctional compound comprising at least two aziridine functional groups.

26. The adhesive tape according to any one of the preceding items, wherein the cationically self-polymerizable monomer is a polyfunctional aziridine, in particular a bis-aziridino compound.

27. The adhesive tape according to any one of the preceding items, wherein the cationically self-polymerizable monomer is an aziridino-functional oligomer, in particular an aziridino-functional polar oligomer.

28. The adhesive tape according to any one of the preceding items, wherein the cationically self-polymerizable monomer is an aziridino-functional compound based on an oligomer backbone, in particular a polar oligomer backbone, comprising in particular a (linear) polyether, a (linear) polyester or a (linear) polythioether.

29. The adhesive tape according to any one of the preceding items, wherein the cationically self-polymerizable monomer is an aziridino-functional (linear) polyether oligomer, in particular an N-alkyl aziridino-functional (linear) polyether oligomer.

30. The adhesive tape according to any one of the preceding items, wherein the (linear) polyether oligomer backbone is obtained by copolymerization of tetrahydrofuran units, ethylene oxide units, and optionally propylene oxide units.

31. The adhesive tape according to any one of the preceding items, wherein the cationically self-polymerizable monomer has the following formula:

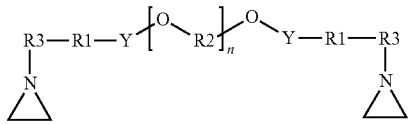

wherein:
R$^1$ is a covalent bond or an alkylene group;
each R$^2$ is independently selected from the group consisting of alkylene groups;
R$^3$ is a straight chain or branched alkylene groups;
Y is a divalent linking group;
and n is an integer selected such that the calculated number average molecular weight of the polyether oligomer is in particular greater than 2000 g/mol.

32. The adhesive tape according to any one of the preceding items,
wherein the cationically self-polymerizable monomer has the following formula:

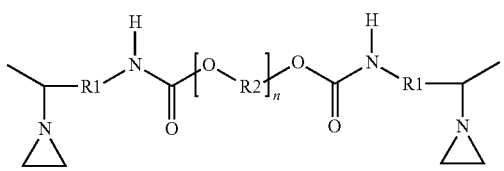

wherein:
R$^1$ is an alkylene group;
each R$^2$ is independently selected from the group consisting of alkylene groups having 2 to 6 carbon atoms; and
n is an integer selected such that the calculated number average molecular weight of the polyether oligomer is in particular between 2000 and 10.000 g/mol.

33. The adhesive tape according to any one of the preceding items, wherein the cationically self-polymerizable monomer has the following formula:

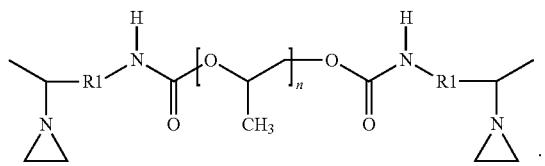

34. The adhesive tape according to any one of the preceding items, wherein R$^1$ is an alkylene group having two carbon atoms.

35. The adhesive tape according to any one of the preceding items, wherein R$^2$ is independently selected from the group consisting of linear alkylene groups having 2 to 6 carbon atoms.

36. The adhesive tape according to any one of the preceding items,
wherein the cationically self-polymerizable monomer has the following formula:

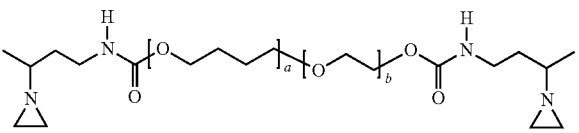

wherein a and b are integers greater than or equal to 1, and the sum of a and b is equal to n.

37. The adhesive tape according to any one of the preceding items, wherein n is selected such that the calculated number average molecular weight of the cationically self-polymerizable monomer is no greater than 10.000 grams/mole.

38. The adhesive tape according to any one of the preceding items, wherein the curable monomer which is different from the cationically self-polymerizable monomer is a cationically curable monomer, which is in particular curable by cationic ring-opening curing.

39. The adhesive tape according to any one of the preceding items, wherein the curable monomer which is different from the cationically self-polymerizable monomer comprises at least one functional group selected from the group consisting of epoxy groups, in particular glycidyl groups.

40. The adhesive tape according to any one of the preceding items, wherein the curable monomer is an epoxy resin, in particular selected from the group consisting of phenolic epoxy resins, bisphenol epoxy resins, hydrogenated epoxy resins, aliphatic epoxy resins, halogenated bisphenol epoxy resins, novolac epoxy resins, and any mixtures thereof.

41. The adhesive tape according to any one of the preceding items, wherein the curable monomer is an epoxy resin selected from the group consisting of novalac epoxy resins, bisphenol epoxy resins, in particular those derived from the reaction of bisphenol-A with epichlorhydrin (DGEBA resins), and any mixtures thereof.
42. The adhesive tape according to any one of the preceding items, wherein the polymerization initiator of the cationically self-polymerizable monomer is selected from the group consisting of protonating agents, alkylating agents, and any combinations or mixtures thereof.
43. The adhesive tape according to any one of the preceding items, wherein the polymerization initiator of the cationically self-polymerizable monomer is selected from the group consisting of alkylating agents, in particular from the group consisting of arylsulphonic acid esters, sulfonium salts, in particular alkyl sulfonium salts, and any combinations or mixtures thereof.
44. The adhesive tape according to any one of the preceding items, wherein the polymerization initiator of the cationically self-polymerizable monomer is selected from the group of arylsulphonic acid esters, in particular from the group consisting of p-toluene sulphonic acid esters, and preferably methyl-p-toluene sulfonate.
45. The adhesive tape according to any one of the preceding items, wherein the polymerization initiator of the cationically self-polymerizable monomer is selected from the group consisting of protonating agents, in particular from the group consisting of Lewis acids, Broensted acids or precursor of Broensted acids, and any combinations or mixtures thereof.
46. The adhesive tape according to any one of the preceding items, wherein the polymerization initiator of the cationically self-polymerizable monomer is selected from the group consisting of Broensted acids, in particular from the group consisting of sulfonic acids, sulfonium acids, phosphonic acids, phosphoric acids, carboxylic acids, antimonic acids, boric acids, and any combinations, mixtures or salts thereof.
47. The adhesive tape according to any one of the preceding items, wherein polymerization initiator of the cationically self-polymerizable monomer is selected from the group consisting of Broensted acids, in combination with antacid-acting components, in particular selected from the group consisting of oxides, hydroxides, carbonates and carboxylates of the elements aluminium, chromium, copper, germanium, manganese, lead, antimony, tin, tellurium, titanium and zinc.
48. The adhesive tape according to any one of the preceding items, wherein the antacid-acting component is selected to comprise zinc, and wherein the polymerization initiator of the cationically self-polymerizable monomer is in particular selected to be zinc tosylate.
49. The adhesive tape according to any one of the preceding items, wherein the curing initiator of the curable monomer is selected from the group consisting of rapid-reacting (thermally-initiated) curing initiators, latent (thermally-initiated) curing initiators, and any combinations or mixtures thereof.
50. The adhesive tape according to any one of the preceding items, wherein the curing initiator of the curable monomer is selected from the group consisting of primary amines, secondary amines, and any combinations or mixtures thereof.
51. The adhesive tape according to any one of the preceding items, wherein the amines are selected from the group consisting of aliphatic amines, cycloaliphatic amines, aromatic amines, aromatic structures having one or more amino moiety, polyamines, polyamine adducts, dicyandiamides, and any combinations or mixtures thereof.
52. The adhesive tape according to any one of the preceding items, wherein the curing initiator of the curable monomer is selected from the group consisting of dicyandiamide, polyamines, polyamine adducts, and any combinations or mixtures thereof.
53. The adhesive tape according to any one of the preceding items, wherein the curing initiator of the curable monomer is selected to be dicyandiamide.
54. The adhesive tape according to any one of the preceding items, which further comprises a curing accelerator of the curable monomer, which is in particular selected from the group consisting of polyamines, polyamine adducts, ureas, substituted urea adducts, imidazoles, imidazole salts, imidazolines, aromatic tertiary amines, and any combinations or mixtures thereof.
55. The adhesive tape according to any one of the preceding items, wherein the curing accelerator of the curable monomer is selected from the group of polyamine adducts, substituted ureas, in particular N-substituted urea adducts.
56. The adhesive tape according to any one of the preceding items, which further comprises a second curable monomer which is different from the cationically self-polymerizable monomer.
57. The adhesive tape according to any one of the preceding items, wherein the second curable monomer comprises at least one functional group selected from the group consisting of epoxy groups, in particular glycidyl groups.
58. The adhesive tape according to any one of the preceding items, wherein the second curable monomer is an epoxy resin, in particular selected from the group consisting of phenolic epoxy resins, bisphenol epoxy resins, hydrogenated epoxy resins, aliphatic epoxy resins, halogenated bisphenol epoxy resins, novolac epoxy resins, and any mixtures thereof.
59. The adhesive tape according to any one of the preceding items, wherein the second curable monomer is an epoxy resin selected from the group consisting of hydrogenated bisphenol epoxy resins, in particular those derived from the reaction of hydrogenated bisphenol-A with epichlorhydrin (hydrogenated DGEBA resins), and any mixtures thereof.
60. The adhesive tape according to any one of the preceding items, wherein the partially cured precursor of a (hybrid) structural adhesive composition further comprises a thermoplastic resin having in particular a glass transition temperature (Tg) in a range from 60° C. to 140° C., from 70° C. to 120° C., from 80° C. to 100° C., or even from 85° C. to 95° C., when measured by Differential Scanning calorimetry (DSC).
61. The adhesive tape according to any one of the preceding items, wherein the thermoplastic resin is selected from the group consisting of polyether thermoplastic resins, polypropylene thermoplastic resins, polyvinyl chloride thermoplastic resins, polyester thermoplastic resins, polycaprolactone thermoplastic resins, polystyrene thermoplastic resins, polycarbonate thermoplastic resins, polyamide thermoplastic resins, polyurethane thermoplastic resins, and any combinations of mixtures thereof.

62. The adhesive tape according to any one of the preceding items, wherein the thermoplastic resin is selected from the group of polyether thermoplastic resins, and in particular polyhydroxyether thermoplastic resins.
63. The adhesive tape according to any one of the preceding items, wherein the polyhydroxyether thermoplastic resins are selected from the group consisting of phenoxy resins, polyether diamine resins, polyvinylacetal resins, in particular polyvinyl butyral resins, and any combinations or mixtures thereof.
64. The adhesive tape according to any one of the preceding items, wherein the thermoplastic resin is selected from the group of phenoxy resins.
65. The adhesive tape according to any one of the preceding items, which is substantially free of acrylic-based monomers or acrylic resins.
66. The adhesive tape according to any one of the preceding items, which is substantially free of free radical-polymerizable monomers or compounds, in particular irradiation-initiated free radical initiators.
67. The adhesive tape according to any one of the preceding items, wherein the partially cured precursor of a (hybrid) structural adhesive composition further comprises fused silica.
68. The adhesive tape according to item 67, wherein the fused silica is contained in the adhesive tape or in the precursor of a (hybrid) structural adhesive composition in an amount in the range of from 0 to 30 wt.-%, preferably from 1 to 25, more preferably from 5 to 20 wt.-%, based on the total weight of the adhesive tape or the precursor of a (hybrid) structural adhesive composition.
69. The adhesive tape according to any one of the preceding items, wherein the tape is obtained from precursor of a (hybrid) structural adhesive composition comprising:
a) from 0.1 to 20 wt %, from 0.5 to 15 wt %, from 0.5 to 10 wt %, or even from 1 to 5 wt % of a cationically self-polymerizable monomer;
b) from 10 to 80 wt %, from 20 to 70 wt %, or even from 20 to 60 wt %, of a curable monomer;
c) from 0.01 to 10 wt %, from 0.02 to 8 wt %, from 0.05 to 5 wt %, from 0.1 to 3 wt %, or even from 0.2 to 2 wt %, of a polymerization initiator of the cationically self-polymerizable monomer;
d) from 0.1 to 20 wt %, from 0.2 to 15 wt %, from 0.2 to 10 wt %, from 0.5 to 8 wt %, or even from 1 to 6 wt %, of a curing initiator of the curable monomer;
e) from 0 to 60 wt %, from 1 to 50 wt %, from 1 to 40 wt %, from 2 to 30 wt %, from 5 to 30 wt %, from 5 to 20 wt %, or even from 8 to 15 wt %, of a second curable monomer;
f) from 0 to 20 wt %, from 0.2 to 15 wt %, from 0.2 to 10 wt %, from 0.5 to 8 wt %, or even from 1 to 5 wt %, of a thermoplastic resin; and
g) from 0 to 20 wt %, from 0.05 to 15 wt %, from 0.1 to 10 wt %, from 0.5 to 8 wt %, or even from 0.5 to 5 wt %, of a curing accelerator of the curable monomer;
h) from 0 to 30 wt.-%, preferably from 1 to 25, more preferably from 5 to 20 wt.-% of fused silica, and
i) optionally, a toughening agent.
70. The adhesive tape according to any one of the preceding items, wherein the precursor of a (hybrid) structural adhesive composition comprises a cationically self-polymerizable monomer and a curable monomer in a weight ratio ranging from 0.5:99.5 to 50:50, from 1:99 to 40:60, from 1:99 to 30:70, from 2:98 to 30:70, from 2:98 to 20:80, from 2:98 to 15:85, from 2:98 to 10:90, from 3:97 to 8:92, or even from 3:97 to 6:94.
71. The adhesive tape according to any one of the preceding items, wherein the adhesive tape (the partially cured precursor) exhibits a shear storage modulus in a range from 1000 to 250.000 Pa, from 1000 to 200.000 Pa, from 2000 to 150.000 Pa, from 3000 to 150.000 Pa, from 3000 to 100.000 Pa, or even from 3000 to 80.000 Pa, when measured according to the test method described in the experimental section.
72. The adhesive tape according to any one of the preceding items, wherein the partially cured precursor exhibits a glass transition temperature (Tg) no greater than 0° C., no greater than −5° C., no greater than −10° C., no greater than −15° C., or even no greater than −20° C., when measured by DSC.
73. The adhesive tape according to any one of the preceding items, wherein the adhesive tape exhibits an elongation at break of at least 50%, at least 80%, at least 100%, at least 150%, or even at least 200%, when measured according to tensile test DIN EN ISO 527.
74. An adhesive tape roll, comprising the adhesive tape according to any one of the preceding items.
75. The adhesive tape roll according to item 74, wherein at least one layer, preferably several layers of the adhesive tape are wound around a core.
76. The adhesive tape roll according to item 74 or item 75, wherein no liner materials are contained between the several layers of the adhesive tape.
77. The adhesive tape roll according to any one of items 74 to 76, wherein the roll is in the form of a level-wound roll, planetary roll, or trimmed spool.
78. A method of bonding two parts, the method comprising the following steps:
(i) providing a first part;
(ii) applying the adhesive tape according to any one of items 1 to 73 to a surface of the first part;
(iii) applying the second part to the first part so that the adhesive tape is positioned between the first part and the second part; and
(iv) curing the adhesive tape so as to adhesively bond the two parts.
79. The method according to item 78, wherein the two parts are selected from metal, polymer, composite, wood, glass, and ceramics.
80. The method according to item 78 or 79, wherein the material of the first part and the second part are the same or different.
81. The method according to any one of items 78 to 80, wherein the material of the first part is different from the material of the second part.
82. The method according to any one of item 78 to 81, wherein the material of the first and second part is metal, wherein the metal is selected from steel, aluminium, magnesium, titanium, copper and their alloys.
83. The method according to any one of items 78 to 82, wherein the adhesive tape has a first portion near a first end of the adhesive tape and a second portion near the second end opposite to the first end of the adhesive tape;
wherein the first metal part comprises a first metal panel having a first body portion and a first flange portion along a margin of said first body portion adjacent a first end of said first body portion;

wherein the second metal part comprises a second metal panel having a second body portion and a second flange portion along a margin of said second body portion adjacent a second end of said second body portion;

wherein the method comprises the steps of:

(i) adhering the adhesive tape to said first metal panel or second metal panel, whereby following adhering and folding, a metal joint is obtained wherein the adhesive tape is folded such that:

the first portion of the adhesive tape is provided between the second flange of the second metal panel and the first body portion of the first metal panel, and the second portion of the adhesive tape is provided between the first flange of the first metal panel and the second body portion of the second metal panel; and (ii) curing the adhesive tape, thereby bonding the metal joint.

84. The method according to item 83, wherein a side of a first edge portion of the first metal part is folded back and a hem flange structure is formed so as to sandwich the second metal part, and the adhesive tape according to any of items is disposed so as to adhere at least the first edge portion of the first metal part and a first surface side of the second metal part to each other.

85. An assembly, comprising at least two parts which are connected by the adhesive tape according to any one of items 1 to 73.

86. The assembly according to item 85, wherein one or all of the parts are panels.

87. The assembly according to item 85 or item 86, wherein material of the parts are selected from metal, polymer, wood, glass, ceramics, composite and carbon fiber.

88. The assembly according to any one of items 85 to 87, wherein the material of the first part is different from the material of the second part.

89. The assembly according to any one of items 85 to 88, wherein the material of the first and further parts is selected from metal.

90. The assembly according to item 89, wherein the metal is selected from steel, aluminium, magnesium, titanium, copper, and its corresponding alloys.

91. The assembly according to any one of items 88 to item 90, wherein the metal of the first part is selected from steel and the metal of the second part is selected from aluminium, magnesium, or titanium, preferably from aluminium.

92. The assembly according to any one of items 85 to 91, wherein the assembly is a hem flange.

93. Use of the adhesive tape according to any one of items 1 to 73 or of the adhesive tape roll according to any one of items 74 to 77 for manufacturing, maintenance or repair operations in industry, preferably construction, medicinal technologies, aerospace, marine, transportation/rail or automotive industries.

94. The use according to item 93, wherein the use comprises adhesively connecting parts and/or metals.

95. The use according to item 93 or item 94, wherein the use comprises body-in-white manufacturing operations in the automotive industries.

96. The use according to any one of items 93 to 95, wherein the use comprises manufacturing of hem flange structures.

EXAMPLES

The present disclosure is further illustrated by the following examples. These examples are merely for illustrative purposes only and are not meant to be limiting on the scope of the appended claims.

Test Methods

Preparation of the Elastic Structural Adhesive Tape:

The elastic structural adhesive tapes are prepared from an extruded mixture of two components (Part B and Part A). The preparation of both, part A and B, is described hereinafter. Parts A and Part B are weighed into a beaker in the appropriate mixing ratio and mixed at 3500 rpm for 0.5 minutes until a homogeneous mixture is achieved. As soon as this step is completed the mixing initiates the first reaction step (stage-B reaction step) resulting in a partially cured precursor within a period ranging from 30 to 60 minutes. Within the open time, the obtained paste was applied to a PTFE treated glass fiber liner using a knife coater. The thickness of the tape was adjusted via the coater in ranges between 0.3 mm to 1.0 mm. The tape was then allowed to crosslink at room temperature. Afterwards, the tape was cut into the right shape, released from the liner and wound onto a PE tape roll core without the liner.

Preparation of the Elastic Structural Adhesive Tape Containing a Mesh:

The elastic structural adhesive tapes are prepared from an extruded mixture of two components (Part B and Part A). The preparation of both, part A and B, is described hereinafter. Parts A and Part B are weighed into a beaker in the appropriate mixing ratio and mixed at 3500 rpm for 0.5 minutes until a homogeneous mixture is achieved. As soon as this step is completed the mixing initiates the first reaction step (stage-B reaction step) resulting in a partially cured precursor within a period ranging from 30 to 60 minutes. Within the open time, the obtained paste was applied to a PTFE treated glass fiber liner on which the nonwoven mesh was placed using a knife coater. The thickness of the tape was adjusted via the coater in ranges between 0.3 mm to 1.0 mm. The tape was then allowed to crosslink at room temperature. Afterwards, the tape was cut into the right shape, released from the liner and wound onto a PE tape roll core without the liner.

Preparation of the Test Samples for OLS and T-Peel Tests:

The surface of OLS and T-peel samples (steel, grade DX54+ZMB-RL1615) are cleaned with n-heptane and in case of oily contaminated samples, coated with 3 g/m² of the testing oil (PL 3802-39S commercially available from Fuchs Petrolub AG, Germany). The test samples are left at ambient room temperature (23° C.+/−2° C., 50% relative humidity+/−5%) for 24 hours prior to testing and the OLS and T-peel strengths are measured as described above.

1) Overlap Shear Strength (OLS) According to DIN EN 1465.

Overlap shear strength is determined according to DIN EN 1465 using a Zwick Z050 tensile tester (commercially available by Zwick GmbH & Co. KG, Ulm, Germany) operating at a cross head speed of 10 mm/min. For the preparation of an Overlap Shear Strength test assembly, adhesive tape having a thickness of about 0.3 mm was applied onto one surface of a test. Afterwards, the sample is covered by a second steel strip forming an overlap joint of 13 mm. The overlap joints are then clamped together using two binder clips and the test assemblies are further stored at room temperature for 4 hours after bonding, and then placed into an air circulating oven for 30 minutes at 180° C. The next day, the samples are either tested directly or undergo ageing and are tested thereafter. Five samples are measured for each of the examples and results averaged and reported in MPa.

Raw Materials

In the examples, the following raw materials and commercial adhesive tapes used are used:

Bisaziridino polyether (BAPE) is a cationically self-polymerizable bisaziridino-functional oligomer having a number average molecular weight of about 6200 g/mol, which is obtained by copolymerization of ethylene oxide and tetrahydrofuran (in a ratio of about 1:4) as described in DE 1 544 837 (Schmitt et al.).

Methyl-p-toluenesulfonate (MPTS) is a polymerization initiator of the cationically self-polymerizable monomer, commercially available from Sigma-Aldrich.

DEN 431 is an epoxy resin, commercially available from DOW Chemical Pacific, The Heeren, Singapore.

Epikote 828 is an epoxy resin, commercially available from Hexion Specialty Chemicals GmbH, Iserlohn, Germany.

Eponex 1510 is a hydrogenated bisphenol epoxy resin, commercially available from Hexion Specialty Chemicals GmbH, Iserlohn, Germany.

Amicure CG1200 is a dicyandiamide-based latent curing initiator for epoxies, commercially from available from Evonik, Allentown, PA, USA.

Ancamine 2014 FG is a polyamine-based curing accelerator for epoxies, commercially available Evonik, Allentown, PA, USA.

Dyhard UR500 is a curing accelerator for epoxies, commercially available from AlzChem Trostberg, Germany.

PK-HA is a phenoxy resin, commercially available from Gabriel Phenoxies Inc., Rock Hill, SC, USA.

KaneAce MX 257 is a toughening agent, commercially available from Kaneka Belgium N.V., Westerlo, Belgium.

KaneAce MX 153 is a toughening agent, commercially available from Kaneka Belgium N.V., Westerlo, Belgium.

Sil Cell 32 is an aluminum silicate filler, commercially available from Stauss Perlite GmbH, Austria.

Shieldex AC-5 is a silica based anti-corrosive agent, commercially available from Grace GmbH, Germany.

MinSil SF20 is a fused silica filler, obtained from 3M Company, USA.

Dynasylan GLYEO is a silane-based adhesion promoter agent, commercially available from Evonik GmbH, Germany.

Glass Beads Class IV, obtained from the 3M Company, USA.

Nonwoven mesh, used herein: 8 gsm Polyester Veil obtained from Technical Fiber Products, Burneside, UK.

EXAMPLES

Preparation of Examples 1-3

The exemplary 2-component (Part A and Part B) curable compositions according to the present disclosure are prepared by combining the ingredients from the list of materials of Table 1 in a high-speed mixer (DAC 150 FVZ Speed-mixer, available from Hauschild Engineering, Germany) stirring at 3500 rpm for 0.5 minutes until a homogeneous mixture is achieved. In Table 1, all concentrations are given as wt. %.

Part B is Prepared as Follows:

KaneAce MX 257, KanAce MX 153, Eponex 1510 ad DEN 431 are placed in a small beaker and mixed together using a planetary high-speed mixer (DAC150 FVZ) at 3500 rpm for 1 minute. Then, methyl-p-toluenesulfonate is added and mixed until a homogeneous mixture is obtained. Thereafter, Sil Cell 32, Shieldex AC-5 and MinSil SF20 are subsequently added and blended into the mixture by mixing at 3500 rpm for 1 minute. Then, Dynasylan GLYEO is added, followed by Glass Beads, resulting into Part B of the 2-component curable compositions.

Part A is Prepared as Follows:

Amicure CG1200 and Ancamine 2014 FG (or Dyhard UR500) are placed in a beaker. Subsequently, the bisaziridino polyether (BAPE) is added to the mixture which is then mixed using a planetary high-speed mixer (DAC150 FVZ) at 3500 rpm for 1 minute until a homogeneous mixture is achieved, resulting into Part A of 2-component curable compositions.

Part A and Part B are weighed into a beaker in the correct mixing ratio and mixed at 3500 rpm for 0.5 minutes until a homogeneous mixture is achieved.

TABLE 1

| Raw material | Weight % | | |
|---|---|---|---|
| | Example 1 | Example 2 | Example 3 |
| BAPE | 4.6 | 4.1 | 4.5 |
| MPTS | — | 0.7 | — |
| DEN 431 | 8.1 | 8.1 | 8 |
| Eponex 1510 | 10.8 | 10.8 | 10.7 |
| Amicure CG1200 | 3.2 | 3.2 | 3.1 |
| Ancamine 2014 FG | 1.6 | 1.6 | 1.6 |
| Tris(2-ethylhexyl)ammoniumtetrafluoroborate | — | — | 0.4 |
| Irgazin Red | — | — | 0.1 |
| KaneAce MX 257 | 27 | 27 | 27 |
| KaneAce MX 153 | 27 | 27 | 27 |
| Sil Cell 32 | 1 | 0.9 | 0.9 |
| Shieldex AC-5 | 1.9 | 1.9 | 1.8 |
| MinSil SF20 | 13.5 | 12.7 | 12.9 |
| Dynasylan GLYEO | 1.1 | 1 | 1 |
| Glass Beads Class IV | — | 1 | 1 |
| Nonwoven mesh | 8 gsm Polyester Veil | 8 gsm Polyester Veil | — |

All of the tapes of Ex. 1 to 3 according to the present disclosure were examined for performance when being unwound from the roll. Every tape of Ex. 1 to 3 was easily unwound from the rolls, without any damage neither to roll nor to unwound tape. The tapes of Ex. 1 to 3 were then stored at RT and the above test for unwinding performance was repeated. All of tapes of Ex. 1 to 3 did not show any deterioration in unwinding performance, even after 5 months after preparation. Also, the tapes did not show any deterioration in adhesive performance, nor did they show any oozing or cold flow.

OLS Performance

TABLE 2

| Results of the OLS | | |
|---|---|---|
| | Example 1 | Example 2 |
| OLS (MPa) | 9.1 | 16.4 |

As can be seen from the results shown in Table 2, the adhesive tapes according to examples 1 and 2 provide excellent performance and characteristics as to overlap shear strength. Failure modes were interpreted as defined in DIN EN ISO 10365:1995. Both example 1 and 2 showed adhesive failure modes.

The invention claimed is:

1. An adhesive tape, comprising a partially cured precursor of an hybrid structural adhesive composition, the composition comprising:
   a polymeric material comprising the self-polymerization reaction product of a polymerizable material comprising a cationically self-polymerizable monomer; wherein the polymeric material comprises a polyetherimine; wherein the cationically self-polymerizable monomer is a polyfunctional compound comprising at least one cyclic amine;
   optionally, some residual polymerization initiator of the cationically self-polymerizable monomer which is initiated at a temperature T1;
   a curable monomer which is different from the cationically self-polymerizable monomer; wherein the curable monomer which is different from the cationically self-polymerizable monomer comprises at least one functional group selected from the group consisting of epoxy groups; and
   a curing initiator of the curable monomer which is initiated at a temperature T2 and which is different from the polymerization initiator of the cationically self-polymerizable monomer, and
   wherein the curable monomers are substantially uncured and are in particular embedded into the polymeric material comprising the self-polymerizable reaction product of a polymerizable material comprising a cationically self-polymerizable monomer.

2. The adhesive tape according to claim 1, wherein the adhesive tape does not comprise a liner.

3. The adhesive tape according to claim 1, wherein the adhesive tape further comprises at least one mesh.

4. The adhesive tape according to claim 3, wherein the at least one mesh is essentially embedded in the adhesive tape.

5. The adhesive tape according to claim 3, wherein the at least one mesh is selected from woven meshes and non-woven meshes.

6. The adhesive tape according to claim 5, wherein the at least one mesh is selected from non-woven meshes.

7. The adhesive tape according to claim 5, wherein the at least one non-woven mesh comprises fibers selected from carbon fibers, polyester fibers, polyamide fibers, polyaramide fibers, nylon fibers, and any mixtures and combinations thereof.

8. The adhesive tape according to claim 1, wherein the polyetherimine is a linear or branched polyethylenimine (PEI).

9. The adhesive tape according to claim 1, wherein the cationically self-polymerizable monomer is a polyfunctional compound comprising two cyclic amines.

10. The adhesive tape according to claim 9, wherein the cyclic amine is selected from the group consisting of aziridines, azetidines, pyrrolidines, piperidines, and any combinations or mixtures thereof.

11. An adhesive tape roll, comprising the adhesive tape according to claim 1.

12. The adhesive tape roll according to claim 11, wherein no liner materials are contained between the several layers of the adhesive tape.

13. The adhesive tape roll according to claim 11, wherein the roll is in the form of a level-wound roll, planetary roll, or trimmed spool.

14. A method of bonding two parts, the method comprising the following steps:
   (i) providing a first part;
   (ii) applying the adhesive tape according to claim 1 to a surface of the first part;
   (iii) applying the second part to the first part so that the adhesive tape is positioned between the first part and the second part; and
   (iv) curing the adhesive tape so as to adhesively bond the two parts.

15. An assembly, comprising at least two parts which are connected by the adhesive tape according to claim 1.

* * * * *